C. W. WOODRUFF AND R. H. PAUSCH.
PROCESS FOR PURIFYING GRAPHITE AND CARBON.
APPLICATION FILED MAY 25, 1920.
1,380,458.
Patented June 7, 1921.
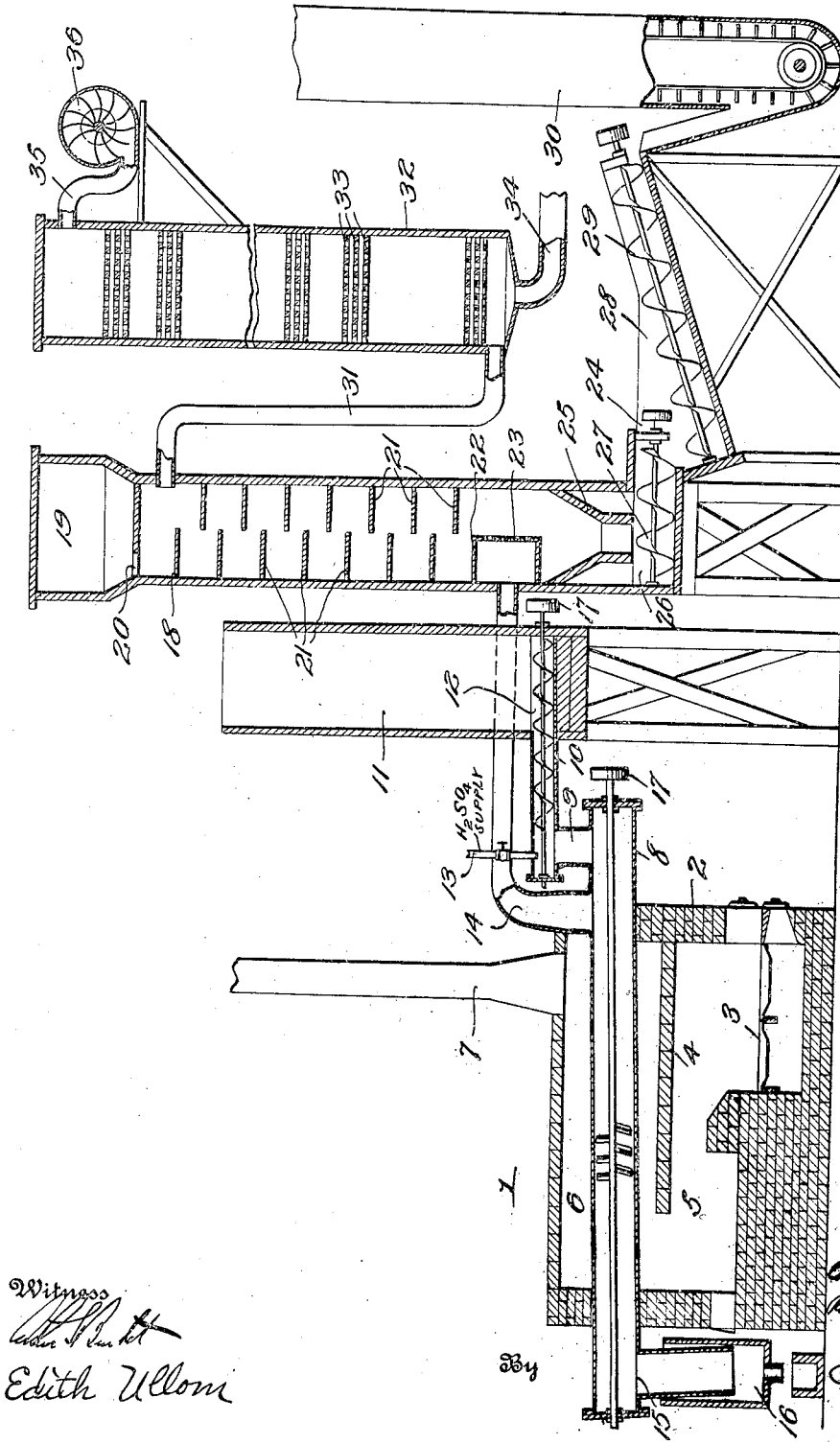

UNITED STATES PATENT OFFICE.

CHARLES W. WOODRUFF AND ROBERT H. PAUSCH, OF COLUMBUS, OHIO.

PROCESS FOR PURIFYING GRAPHITE AND CARBON.

1,380,458.  Specification of Letters Patent.  Patented June 7, 1921.

Application filed May 25, 1920. Serial No. 384,122.

*To all whom it may concern:*

Be it known that we, CHARLES W. WOODRUFF and ROBERT H. PAUSCH, citizens of the United States, residing at Columbus, in the county of Franklin and State of Ohio, have invented certain new and useful Improvements in Processes for Purifying Graphite and Carbon, of which the following is a specification.

This invention relates to an improved process for the purification or refining of graphite or carbon bearing material, or graphite or carbon, either natural or artificial, or any product or deviative of graphite or carbon from graphite ore or carbon of any kind, or natural or artificially graphitized carbon in any form, or so called manufactured graphite or carbon by the use of hydrofluoric acid or hydrogen fluorid in liquid, gaseous or other state.

In way of introduction it may be stated that the gangue in graphite ore or carbon is composed of silica and kaolin and other silicates in an extremely finely divided condition along with some iron oxid stain, and since these minerals are all made soluble by hydrofluoric acid, the present invention consists, therefore, in the introduction of hydrofluoric acid or hydrogen fluorid, in either an aqueous or vaporous state into intimate contact with a body of graphite ore or carbon, this process taking place in a reactor wherein the gaseous hydrogen fluorid is made to pass in a tortuous route, coming into intimate contact with the raw graphite ore or carbon moving slowly in the reactor, during this process chemical reactions take place which serve to practically eliminate the silicious gangue of the ore or carbon.

For a further understanding of the invention, reference is to be had to the following description and to the accompanying drawing:

In which:

The figure represents diagrammatically a vertical longitudinal sectional view taken through the apparatus employed in carrying out the principles of the invention.

Referring more particularly to the details of the invention, use is preferably made of a hydrogen fluorid generator 1. This unit consists of a furnace setting 2, of any suitable design and construction, the same in this instance embodying the usual grate structure 3, an overhead arch 4 and communicating heat passageways 5 and 6, the passageway 6 terminating forwardly in a stack outlet 7. Extending longitudinally through the compartment 6 of the setting is a drum 8, which has its opposite ends passed through the front and rear walls of the setting, the forward end of the drum being provided with a suitable inlet conduit 9, which is in communication with a conveyer tube 10, the latter extending from a fluor spar hopper 11. A conveyer 12 is situated within the tube 10, and by its use it will be evident that the fluor spar ($CaF_2$) situated within the hopper 11 may be led from the latter and introduced into the forward end of the drum 8. Also entering, or at least communicating with the forward end of the tube 10, and with its entrance conduit 9 is a supply pipe 13, through which a suitable quantity of preferably concentrated sulfuric acid is introduced into engagement with the fluor spar. In practice it has been found desirable to offset the inlet end of the pipe 13 from the shaft of the conveyer 12, for purposes of reducing corrosion caused by the acid attacking the metal of the conveyer. It will be observed that the drum 8 is longitudinally inclined in a downward direction toward the rear end of the setting 2, and further, an agitator member is positioned longitudinally within the drum so that a thorough mixing or feeding of the fluor spar will take place as the latter passes through the drum. This feature insures a proper intermingling of the supply of sulfuric acid and the fluor spar or fluorid, so that the gaseous hydrogen fluorid (HF) will be produced together with calcium sulfate ($CaSO_4$), the hydrogen fluorid owing to its volatile character will be caused to flow forwardly, and will be discharged from the drum 8 by way of the outlet 14, the calcium sulfate will be discharged from the drum by way of the discharge tube 15, located at the extreme rear end of said drum, and may be connected in any suitable manner such, for example, as the tank construction 16 disclosed. It will of course be understood that the conveyer 12 and the agitator may be rotated in any suitable manner, this may be accomplished by passing power driven belts over the pulleys 17 disclosed in connection with said members. Moreover, it is not essential that the fluor spar be heated by means of the furnace construction shown, as oil burners or other equivalents can be utilized for this purpose. The reactions between the chemicals so far described are as follows:

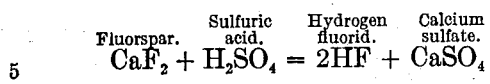

$$CaF_2 + H_2SO_4 = 2HF + CaSO_4$$
(Fluorspar. Sulfuric acid. Hydrogen fluorid. Calcium sulfate.)

The outlet 14 extends forwardly and is terminated within substantially the lower portion of a vertical reactor 18. This reactor in the present form of the invention, is in the nature of a wooden tower and has its upper portion formed with a magazine 19 capable of receiving a suitable quantity of a graphite or carbon bearing material, either natural or artificially graphitized carbon in any form or so called manufactured graphite, which is capable of being fed downwardly within the reactor through the medium of an opening 20 provided in the column of the magazine. This graphite or carbon bearing material or ore moves downwardly by gravity, and its path of travel is a slow and tortuous one, this being effected by the introduction of vertically spaced shelves 21, which are horizontally located within the tower and project from opposite sides thereof, the shelves on one side being arranged so as to lie horizontally between the coöperative shelves on the other side. In view of this arrangement the ore will move in a sinuous path, and by the location of the shelves its travel will be rendered comparatively slow. Beneath the shelves 21 the tower is provided with an inwardly disposed receptacle 22 into which the outlet 14 discharges, and the inner wall of this receptacle is perforated as at 23, whereby the hydrogen fluorid or hydro-fluoric acid may be efficiently introduced into the lower end of the tower without having the discharge end of said outlet obstructed by the flowing ore. By this method the following reaction between the hydrogen fluorid and the silicious gangue of the ore takes place:

$$SiO_2 + 4HF = 2H_2O + SiF_4$$
(Quartz. Hydrogen-fluorid. Water. Silicon fluorid (gaseous).)

$$Al_2O_3.2SiO_2.2H_2O + 14HF = 2AlF_3 + 2SiF_4 + 9H_2O$$
(Kaolinite. Hydrogen-fluorid. Aluminum-fluorid. Silicon fluorid. Water.)

The upwardly moving hydro-fluoric acid which is preferably used as a vapor, therefore, comes into intimate contact with a downwardly moving body of ore so that the impurity present in largest amount, namely silica, is driven off as a gas, silicon tetrafluorid, which is absorbed in water trickling down through the wooden tower. The graphite or carbon coming out of the bottom of the reactor tower drops into a tank 24 containing water, which dissolves out any iron or aluminum fluorids or sulfates and any sulfuric or hydrofluoric acid which may remain in the ore. This feature may be mechanically accomplished by providing the bottom of the reactor with a funnel 25, which discharges into the rear compartment 26 of the tank 24. A conveyer screw 27 is situated within the compartment 26 and is adapted to convey the purified graphite or carbon deposited therein outwardly into the main inclined compartment 28 of said tank. An elongated conveyer 29 is angularly situated with respect to the horizontal, in the compartment 28 and leads the purified product, which is finally washed in the water of the tank, out of the compartment 28 and deposits the same within an elevator 30, by means of which the graphite or carbon may be conducted to a suitable place of storage, where it way be dried, ground and otherwise treated for purpose of shipment. It may be stated that the calcium sulfate which is discharged from the generator is removed continually and automatically and by the provision of the tank construction 16 the same may be caught and collected for purposes of storage or handling. The exhaust gases leave the upper portion of the reactor tower by way of the conduit 31, and are discharged into the lower end of what is commonly called a scrubber 32. This device merely consists of a receptacle wherein is provided a plurality of spaced wooden grid members 33, through which the gases circulate in an upward direction, the liquid condensation which occurs being allowed to drop downwardly and to be passed from the scrubber by way of an outlet pipe 34, which condensate may be suitably collected. The gases are caused to be positively circulated through the scrubber and pass out of the latter by way of an outlet member 35, which communicates with a rotary suction fan or an equivalent 36. The product of the reactions thus effected by the provision of the scrubber may be collected from the bottom in any suitable manner and used for any desired purpose.

It will be seen that all of the processes involved in the purification of the graphite ore or carbon are continuous and practically automatic and therefore the invention involves a minimum labor charge.

The terms graphite containing material, or graphite bearing materials employed in the following claims are intended to be construed as meaning graphite or carbon bearing material, or graphite or carbon, either natural or artificial, or any product or derivative of graphite or carbon from graphite ore or carbon of any kind, or natural or artificial graphitized carbon in any form or so called manufactured graphite. Also, the expression "The process of purifying graphite containing material" specifically means the extraction of graphite or carbon from graphite or carbon containing materials, or the separation of graphite or carbon from impurities in graphite or carbon containing materials, or the elimination of the impurities of graphite or carbon from graphite or carbon bearing material either naturally or artificially produced.

The graphite or carbon bearing material may or may not be heated while purification proceeds, and the carbon bearing material or graphite may or may not be moistened with water or sulfuric acid while purification proceeds and gaseous hydrochloric acid may or may not be generated along with the hydrochloric acid while purification proceeds.

What is claimed is:

1. The process of obtaining purified graphite or carbon from graphite or carbon containing material, which consists in generating hydrofluoric acid and in introducing such acid when in a gaseous state into intimate contact with said graphite or carbon containing material, and washing soluble compounds from the graphite or carbon material so treated.

2. The process of purifying graphite or carbon by removing impurities from graphite or carbon containing material, which consists in passing hydrogen fluorid in a gaseous state through a body of said material and washing out the soluble compounds from the material so treated.

3. The process of purifying graphite or carbon bearing material, which consists in generating gaseous hydrogen fluorid, and in bringing the vapors thereof into intimate contact with a body of said graphite bearing material and washing soluble compounds from the material so treated.

In testimony whereof we affix our signatures.

CHARLES W. WOODRUFF.
ROBERT H. PAUSCH.